(12) United States Patent
Wu et al.

(10) Patent No.: US 8,572,665 B2
(45) Date of Patent: Oct. 29, 2013

(54) SELECTIVE DISTRIBUTION OF CELL BASED VIDEO STREAMS OVER PACKET BASED NETWORKS

(75) Inventors: Michael Wu, Palo Alto, CA (US); Richard Neff, Chandler, AZ (US); Rajesh R. A., Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 1649 days.

(21) Appl. No.: 10/793,591

(22) Filed: Mar. 3, 2004

(65) Prior Publication Data

US 2005/0195811 A1 Sep. 8, 2005

(51) Int. Cl.
*H04N 7/173* (2011.01)
*H04N 7/16* (2011.01)
*H04L 12/66* (2006.01)

(52) U.S. Cl.
USPC ................ 725/118; 725/143; 370/352

(58) Field of Classification Search
USPC ................... 370/389, 396, 395, 429
See application file for complete search history.

(56) References Cited

U.S. PATENT DOCUMENTS

| | | | |
|---|---|---|---|
| 6,028,860 A | 2/2000 | Laubach et al. | |
| 6,151,324 A * | 11/2000 | Belser et al. | 370/397 |
| 7,032,031 B2 * | 4/2006 | Jungck et al. | 709/246 |
| 7,136,374 B1 * | 11/2006 | Kompella | 370/352 |
| 7,221,675 B2 * | 5/2007 | Bryden et al. | 370/392 |
| 7,260,097 B2 * | 8/2007 | Casey | 370/392 |
| 2002/0085567 A1 | 7/2002 | Ku et al. | |
| 2002/0174251 A1 | 11/2002 | Lasserre | |
| 2003/0108051 A1 | 6/2003 | Bryden et al. | |
| 2003/0123446 A1 | 7/2003 | Muirhead et al. | |
| 2005/0152366 A1 * | 7/2005 | Heuck | 370/390 |

OTHER PUBLICATIONS

Ooghe et al., "Impact of the Evolution of the Metropolitan Network on the DSL Access Architecture", IEEE Communications Magazine, Feb. 2003.*
PCT Application No. PCT/US2005/06888 Written Opinion dated Dec. 18, 2006.
PCT Application No. PCT/US2005/06888 Int'l Search Report dated Dec. 18, 2006.
Lasserre et al., "Virtual Private LAN Services Over MPLS", Internet Draft-, Mar. 2003, httt://www.ietf.org/shadow.html.
Chinese First Office Action mailed Apr. 11, 2008 for Application No. 200580006647.4.
CN Second Office Action dated Feb. 12, 2010, Application No. 200580006647.4.
CN Office Action dated Jul. 4, 2011, Application 200580006647.4.
CN Office Action dated Nov. 2, 2011, Application No. 200580006647.4.
EP Supplementary European Search Report dated May 30, 2011, Application No. 05724433.7.

* cited by examiner

*Primary Examiner* — Chris Parry
*Assistant Examiner* — James R Marandi
(74) *Attorney, Agent, or Firm* — Weaver Austin Villeneuve & Sampson LLP (57) ABSTRACT

According to the present invention, methods and apparatus are provided to allow selective distribution of video information over packet based networks. Video information associated with a particular channel is received at an edge router from a cell based network. The edge router uses label switching to selectively distribute the video information to designated nodes in the packet based network.

31 Claims, 8 Drawing Sheets

Figure 1

PRIOR ART

Figure 2

PRIOR ART

| Channel 501 | Virtual Circuit 503 | Virtual LAN 505 | Label 507 |
|---|---|---|---|
| 53 | 32 | 81 | 101 |
| 54 | 83 | 94 | 151 |
| ... | ... | ... | ... |
| 81 | 62 | 109 | 231 |

SELECTIVE DISTRIBUTION OF CELL BASED VIDEO STREAMS OVER PACKET BASED NETWORKS

BACKGROUND OF THE INVENTION

1. Field of the Invention

The present invention generally relates to the distribution of data. More specifically, the present invention provides techniques and mechanism for effectively and efficiently distributing channelized video streams from a cell based network onto a packet based network.

2. Description of Related Art

A dedicated network such as a Synchronous Optical Network (SONET) provides a mechanism for delivering video to multiple remote locations. Remote locations such as rural towns or cities can be connected to a content provider through the dedicated network. Video streams for various channels are allocated fixed time slots for transmission.

Video can be delivered from a content provider to a customer primarily using a cell based architecture. However, dedicated networks are often inflexible. Once time slots are allocated, the time slots can not be reallocated based dynamic changes in bandwidth requirements. Furthermore, dedicated networks are often expensive to maintain and incompatible with more ubiquitous packet based networks. Upgrading dedicated video delivery networks to packet based networks, however, can be prohibitively expensive.

Consequently, it is desirable to provide techniques for improving the mechanisms and techniques for integrating packet based and cell based networks for delivery of video streams. It is also desirable to allow for tiered upgrades of dedicated networks while providing many of the benefits of a packet based architecture.

SUMMARY OF THE INVENTION

According to the present invention, methods and apparatus are provided to allow selective distribution of video information over packet based networks. Video information associated with a particular channel is received at an edge router from a cell based network. The edge router uses label switching to selectively distribute the video information to designated nodes in the packet based network.

In one embodiment, a method for transmitting video data over a packet switched network is provided. Video data transmitted over a cell-based network is received. The video data is associated with a virtual circuit. The virtual circuit is mapped to a virtual local area network associated with a packet-based network. The virtual local area network is associated with a set of nodes in the packet-based network. The virtual local area network is associated with label information. The label information is used by nodes in the packet-based network to distribute the video data.

In another embodiment, an edge router is provided. The edge router includes an interface and a processor. The interface is configured to receive video data transmitted over a cell-based network. The video data is associated with a virtual circuit. The processor is configured to map the virtual circuit to a virtual local area network associated with a packet-based network and to associate the virtual local area network with label information. The virtual local area network is associated with a set of nodes in the packet-based network. The label information is used by nodes in the packet-based network to distribute the video data.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of video stream delivery. However, it should be noted that the techniques and mechanisms of the present invention, although particularly applicable to video streams, can also be applied to other types of data and signals. In the following description, numerous specific details are set forth in order to provide a thorough understanding of the present invention. The present invention may be practiced without some or all of these specific details. Well-known process operations have not been described in detail in order not to unnecessarily obscure the present invention. Furthermore, the present application's reference to a particular singular entity includes that possibility that the methods and apparatus of the present invention can be implemented using more than one entity, unless the context clearly dictates otherwise.

A variety of protocols are used to distribute video streams over networks. Video, or any other similarly bandwidth intensive type of data, has typically been distributed in over networks using dedicated infrastructure. In one example, video streams are distributed using a combination of asynchronous transfer mode (ATM) connections and Synchronous Optical Network (SONET) connections. Although the dedicated networks are effective in delivering video streams, they are often expensive and inflexible. Furthermore, these dedicated networks are typically not well integrated with more common packetized networks.

Increasing capabilities of packetized networks such as Internet Protocol (IP) networks allow delivery of video streams without the use of dedicated infrastructure. Conventionally, infrastructure was often built and dedicated to the single purpose of delivering video. In one example, a group of cities in a rural area would receive video data from a satellite feed distributed over this dedicated network infrastructure. Much of this infrastructure is inflexible and is gradually being phased out. However, much of this dedicated infrastructure is still in operation. Furthermore, the cost of completely replacing this dedicated infrastructure with a more flexible IP network would be prohibitive. In many instances, it would be desirable to continue using this dedicated infrastructure in a manner that allows tiered upgrades to a packetized architecture.

In some instances, service providers may wish to continue using the dedicated infrastructure alongside packetized networks. Groups of nodes could be upgrade while retaining the functionality of other nodes in the network. Consequently, the techniques of the present invention allow efficient integration of packetized networks with legacy networks dedicated to delivering data streams such as video streams.

Figure 1:
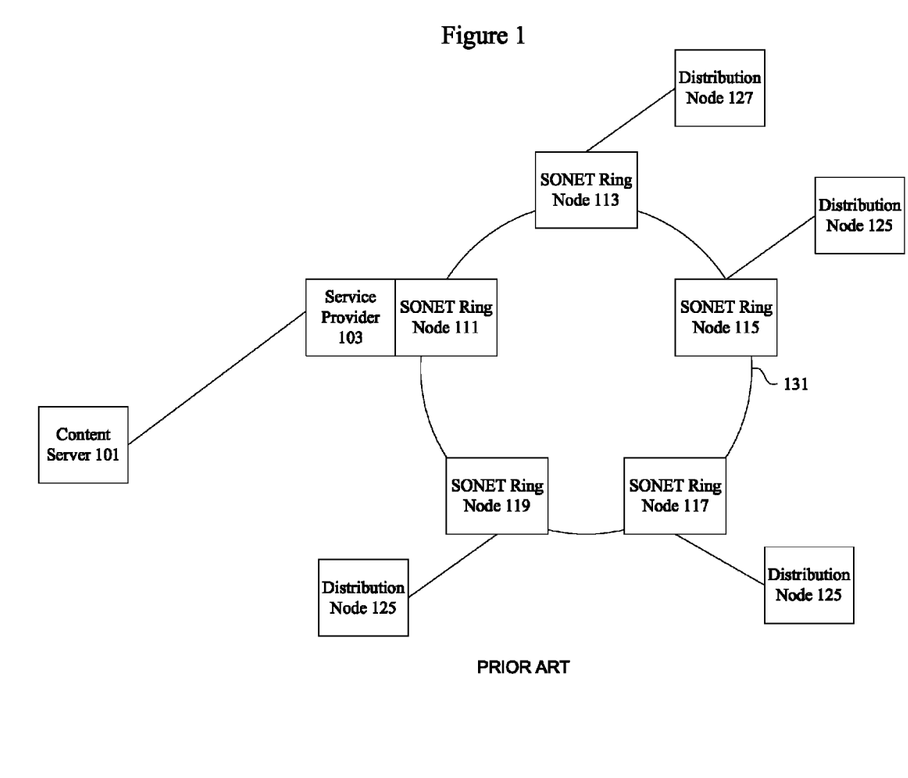
FIG. 1 is a diagrammatic representation of a system delivery video using a cell-based architecture.

FIG. 1 is a dynamite representation showing one example of a dedicated network typically used to deliver video streams. The dedicated network includes a content server 101. In one example of content server 101 is a satellite feed providing video streams to a relatively remote location, such as a sparsely populated area. In another example, the content server 101 includes a database of video information. In still other examples, the content server 101 is integrated with broadcast stations providing video content. The content server 101 typically delivers video information to a service provider 103 by arranging the video information into fixed sized cells.

According to various embodiments, the video information is Motion Pictures Experts Group (MPEG2) encoded and provided to service provider 103 using Asynchronous Transfer Mode (ATM) cells. Identifiers are typically provided with each cell to indicate the channel the video information is associated with. The video information for hundreds of different channels can be provided using hundreds of different virtual circuit identifiers. The service provider 103 organizes the video information for transmission to various distribution nodes 121-127 through a dedicated infrastructure such as a SONET ring 131.

In some examples, a few distribution nodes are located in each of a number of smaller towns. Service provider 103 formats the video stream cells for transmission onto the SONET ring 131. A variety of cell adaptation techniques can be used. A video stream transmitted using ATM cells can be transmitted onto a SONET ring 131 using ATM adaptation layer 5 (AAL5). Using AAL 5, the service provider 103 converts the video streams sells into blocks of two video frames connected to a trailer. In one example, 2 MPEG frames are attached to a trailer for transmission onto the dedicated SONET network.

Any network using fixed length cells or fixed length timeslots and adapted fixed length cells is referred to herein as a cell based network. In one example, a cell based network uses time division multiplexing to transmit adapted ATM cells carrying video frames. The time division multiplexing network allocates timeslots for transmission of different data streams. In one example, dozens of repeating timeslots are allocated for transmission of dozens of different channels. In still another example, a cell based network includes multiple nodes transmitting data using ATM cells. Although time division multiplexing network is effective in conveying video data, such a network is inflexible. In many instances, after timeslots are allocated, no new data or additional data can be transmitted until channels are reallocated.

The timeslot based SONET ring 131 infrastructure is used as a broadcast network. In typical instances, a block of video including two video frames and a trailer is transmitted from node 111 to node 119. Node 119 identifies whether a distribution node 121 should receive the video information based on the channel or virtual circuit information. If the distribution node 121 is configured to receive the video stream, video information is forwarded to both distribution node 121 and to the next SONET ring node 117. In many instances, transmission to both the distribution node and the next SONET ring node is accomplished using conventional add and drop multiplexing (ADM). Video information can be sent in either the clockwise or counterclockwise direction in a SONET ring, although typically only one direction is used until a connection failure is detected. When information is transmitted from a SONET ring node 119 to a distribution node 121, the video blocks are typically repackaged to form ATM cells.

The dedicated SONET ring network typically has nodes including a content server 101, a service provider 103, SONET ring nodes 111-119, and distribution nodes 121-127 that are tightly integrated for interoperability. Although the dedicated cell based architecture is inflexible, much of the inflexibility arises from the use of time division multiplexing in the SONET ring. Once time slots are allocated, no additional channels or additional data can be transmitted. A limited upgrade of the SONET rnig portion of the network while maintaining other portions of the architecture can increase flexibility while also controlling costs.

Figure 2:
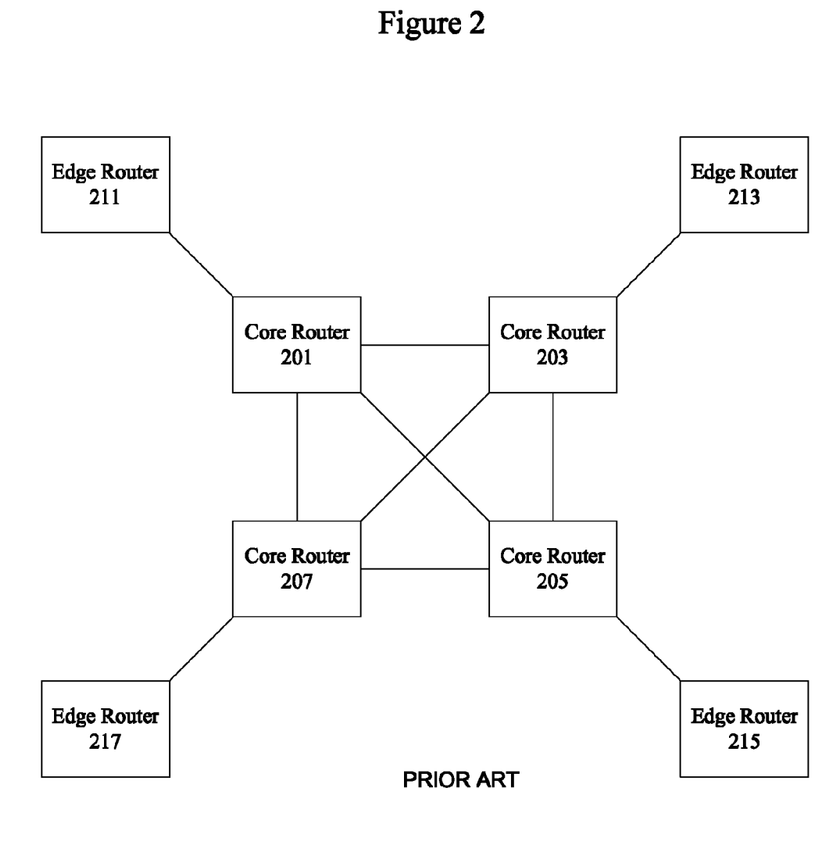
FIG. 2 is a diagrammatic representation of a core packet switched network.

FIG. 2 is a dramatic representation showing a conventional packetized network such as an IP network. Any group of nodes transmitting data using blocks of variable length data is referred to herein as a packet based or packetized network. The packetized network includes highly interconnected core routers 201-207 and more loosely connected edge routers 211-217. Any router coupled to three or more other routers can be referred to as a core router. Any router located more on the periphery of a service provider network and typically connected to either a different type of network or a different service provider's network is referred to as an edge router. In some instances, core routers can become edge routers and vice-versa based on changing network topologies. The terms core router and edge router here are merely used for convenience. In many instances, core and edge routers are interchangeable. Packetized networks are more ubiquitous and also more flexible than a time division multiplexing network such a SONET ring. Individual packets are routed from source to destination using mechanisms such as destination addresses and labels.

A packet travels from one network entity to the next network entity based on a forwarding decision at each router. In one example, a packet travels from core router 207 to core router 205 based on an independent forwarding decision at core router 207. The next hop for a packet is determined based on information such as a destination address in the packet header. A next hop can also be determined using label switching. Label switching allows routers to make forwarding decisions based not on the destination address in the packet header, but instead based on label information associated with a packet. No analysis of the packet header is needed at each hop.

The label in the packet is used to index an entry in a forwarding table or a routing table that includes next hop information and a set of one or more new labels to be used as the packet is forwarded. The next hop can then use a new label to forward the frame. Label switching as Multiprotocol Label Switching (MPLS) for IP networks is described in RFC 3031.

The techniques and mechanisms of the present invention recognize that using label switching allows efficient integration of packet switched networks with conventional dedicated video delivery networks.

Figure 3:
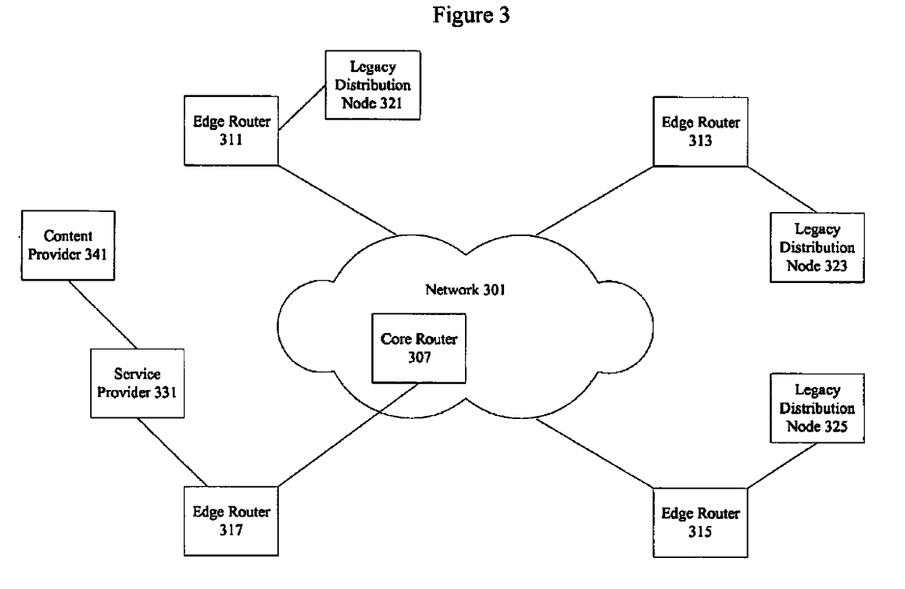
FIG. 3 is a diagrammatic representation of a core packet switched network operating as a video delivery system using legacy distribution and headend nodes.

FIG. 3 is a diagrammatic representation showing one example of integration of a packet based network with a cell based network. The packet based network includes a network 301 associated with edge routers 311-317. Edge routers 311, 313, and 315 are connected not to other packet based routers, but instead are connected to distribution nodes associated with a legacy video transmission network. In one example, legacy distribution nodes 321, 323, and 325 are cell based nodes configured to transmit video streams using ATM cells converted from AAL5 video blocks. In another example, legacy distribution nodes 321, 323, and 325 are configured to transmit MPEG2 frames in a cell based format. Edge router 317 is connected not only to core router 307 but also to a service provider node 331. A legacy service provider node 331 is configured to take a video stream received as fixed sized cells from a content provider 341 and transmit video blocks on a particular channel.

As noted above, video stream cells are often associated with particular virtual circuits or channels. The virtual circuits or channels allow selective distribution of the data to designated distribution nodes. Typical IP networks do not have a mechanism for broadcasting video data and selectively distributing video information based on virtual circuits or channels. Although IP broadcasting mechanisms could be used, additional network infrastructure would have to be changed. In some examples, service provider nodes 331 and legacy distribution nodes 321, 323, and 325 would have to be changed. A content provider 341 may also have to modify transmission formats to support IP broadcast.

However, the techniques of the present invention use label switching to provide a mechanism for broadcasting video data while selectively distributing video data to designated nodes. The selective broadcasting of video data can be accomplished by implementing changes only at edge routers, although other nodes can be changed as well. Any mechanism for distributing video data to a number of designated nodes is referred to herein the selective broadcasting.

The techniques of the present invention contemplate using labels to distribute data such as video data to a number of designated nodes. In one embodiment, an edge router receives video information associated with a particular channel. The edge router then accesses the database to determine what other edge routers are configured to receive the channel. In one example, labels associated with each of the designated edge routers are then appended to a packet containing the video data before transmission of the video data onto the core network. In another example, a single label is accessed from storage to allow transmission of the video data to particular designated nodes. In another example, the nodes in the packet networks are configured as multiple virtual local area networks (VLANs).

Each virtual circuit can correspond to a particular VLAN. In one example, video data in a particular virtual circuit should be transmitted to two legacy distribution nodes 323 and 325. The virtual LAN corresponding to a particular virtual circuit is configured to include edge routers 313, 315, and 317. In another example, a legacy distribution node 321 is configured to receive video data associated with a particular channel. The virtual LAN corresponding to the particular channel is virtually supported by edge routers 311 and 317 using Virtual Private LAN Service (VPLS). Edge router 317 receives video information from a service provider 331. The edge router 317 formats the video data before transmission onto the virtual LAN corresponding to the virtual circuit associated with the video data. VPLS is described in Virtual Private LAN Services Over MPLS by M. Lasserre et al available from the Internet Engineering Task Force as draft-lasserre-vkompella-ppvpn-vpls-04.txt. The virtual private LAN service (VPLS) solution over MPLS, also known as Transparent LAN Services (TLS) creates an emulated LAN segment for a given set of users. It delivers a layer 2 broadcast domain that is fully capable of learning and forwarding on Ethernet MAC addresses that is closed to a given set of users. Many VPLS services can be supported from a provider edge node.

In one example, video data should be distributed to legacy nodes 323 and 325 based on virtual circuit information associated with the video data. An edge router 317, adds label information associated with edge routers 315 associated with the legacy nodes 325. When edge router 315 receives the video information, the edge router forwards video information to legacy node 325 and also adjusts the label to allow transmission of the video information to edge router 313 as well. In typical instances, an edge router would receive data and merely forward data to a single node. However, the techniques of the present invention allow broadcasting video data by having an edge router forward video data to multiple nodes. In one example, the edge router forwards data to a legacy distribution node 325 as well as to another edge router 313.

The forwarding and routing tables used to distribute video data can be provided on a per virtual LAN basis. That is, a routing table is available for each VLAN the edge or core router is a part of. In an example where hundreds of channels are included, each router can have hundreds of forwarding or routing tables. The channel specific routing tables allow broadcast of video information to designated nodes.

Figure 4A:
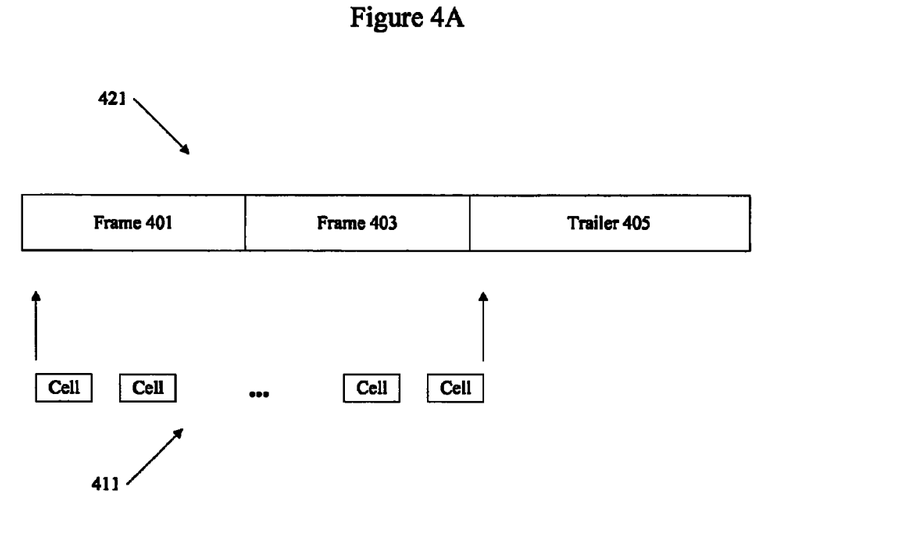
FIG. 4A is a diagrammatic representation showing a protocol data unit transmitted to an edge router.

FIG. 4A is a diagrammatic representation showing conventional ATM cell formats used to transmit video information. According to various embodiments, multiple ATM cells 411 each include video information and a virtual circuit identifier (VCI). In many instances, a virtual path identifier (VPI) is also included. Multiple ATM cells are organized as frames 401 and 403 and combined with a trailer 405 to form protocol data unit (PDU) 421 for transmission onto a network such as a SONET ring. Any video block formed using multiple cells and transmitted onto a time division multiplexing network is referred to herein as a PDU. In one embodiment, each frame 401 and 403 is MPEG frame. ATM cell 411 are received at an edge router from a service provider node and reformatted into PDUs.

Figure 4B:
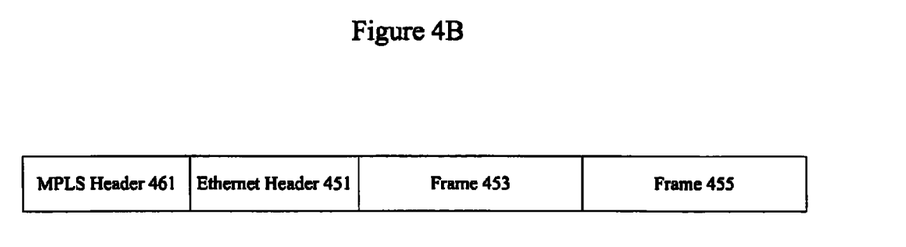
FIG. 4B is a diagrammatic representation showing a label switched packet generated at an edge router.

FIG. 4B is a diagrammatic representation showing a packet format used to transmit video information over packet based networks. According to various embodiments, an edge router receives a PDU and removes a trailer 405. The frames are repackaged with an Ethernet header 451. In one embodiment, the Ethernet header includes a destination address and an unused source address. In another embodiment, the destination address is a broadcast address. An MPLS header 461 including one or more labels identified using channel information from video cells is added to the packet.

Figure 5:
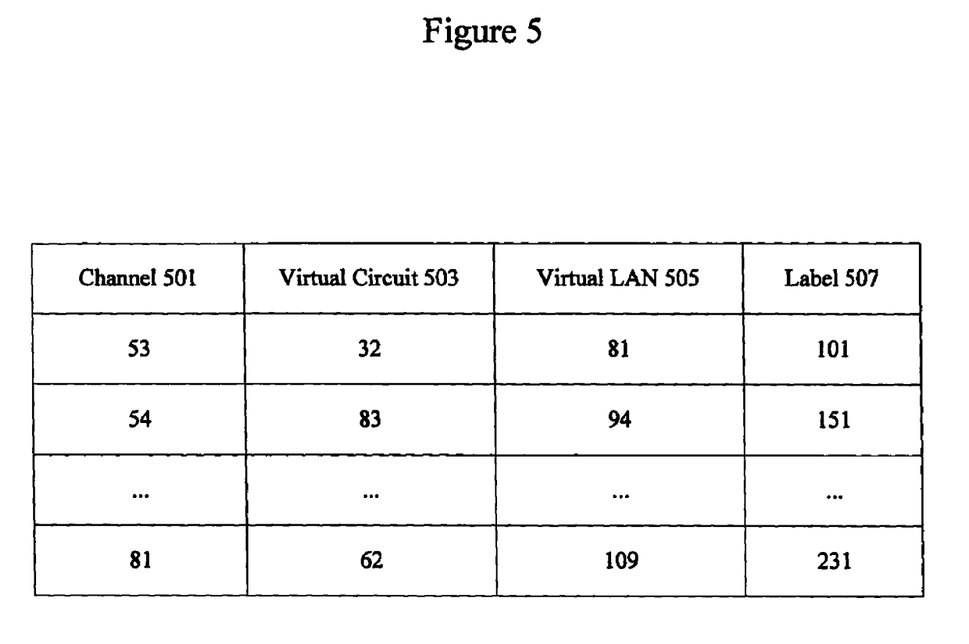
FIG. 5 is a diagrammatic representation of a table used to associate virtual circuits to virtual local area networks.

FIG. 5 is a diagrammatic representation showing one mechanism an edge router can use to determine labels based on virtual circuit information. Any mechanism used to identify specific destination nodes associated with particular virtual circuits is referred to herein as a VLAN mapping table. In one embodiment of VLAN mapping table is written during network set up procedures. A VLAN mapping table can be updated by a network administrator. According to various embodiments, the VLAN mapping table includes columns identifying channels 501, virtual circuits 503, VLANs 505, and labels 507. In one example, the channel 53 corresponds with a virtual circuit 32 and a VLAN 81. Video data associated with a virtual circuit 32 would have a label 101 added to it.

Figure 6:
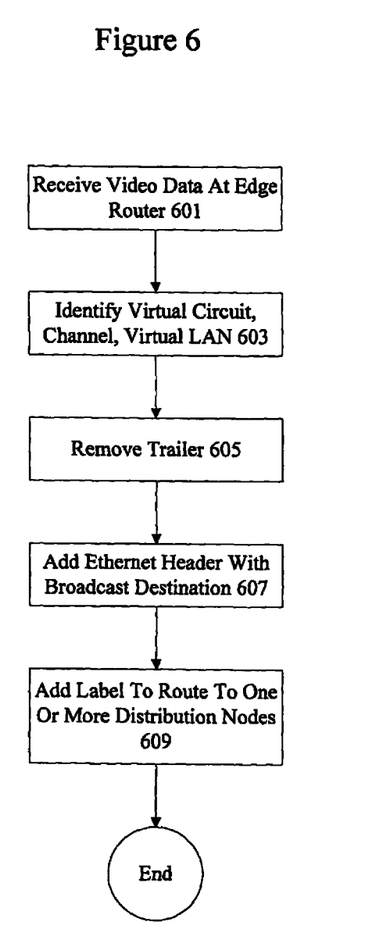
FIG. 6 is a flow process diagram showing a technique for transmitting a protocol data unit over a core packet network.

FIG. 6 is a flow process diagram showing one technique for selectively broadcasting video data from a cell based network onto a packet based network. According to various embodiments, video data is received in edge router at 601. In one example, the video data is received in AAL5 format having two video frames and an associated trailer. According to various embodiments, the two video frames are MPEG2 encoded video frames. At 603, the virtual circuit, channel, and virtual LAN are identified for the video information. In one example, the virtual circuit, channel and virtual LAN are identified from a table set up by the network or system administrator. At 605, the video information trailer is removed. At 607, an Ethernet header is added to the video information. Although the Ethernet header will typically not be used to route the video information, source and destination information can still be provided.

In one example, the source identifier is any random value and the destination of identifier is the broadcast value 0xFFFFFF. At 609, one or more labels are added to the video information to allow routing of the video data. The one or more labels can also be acquired from the VLAN mapping table. One or more labels can be used to broadcast the video information to the designated neighboring nodes. Other nodes in a packet based network can be bypassed by using label routing. In one embodiment, the entire sequence of labels designating the specific route for transmission is added to this video information packet. In another example, a single label is provided. In yet another example, multiple labels associated with each of the designated destination edge routers are provided. A set of designated destination nodes may be determined based on channel information. The packets are forwarded onto the packet based network and routed using label information.

Figure 7:
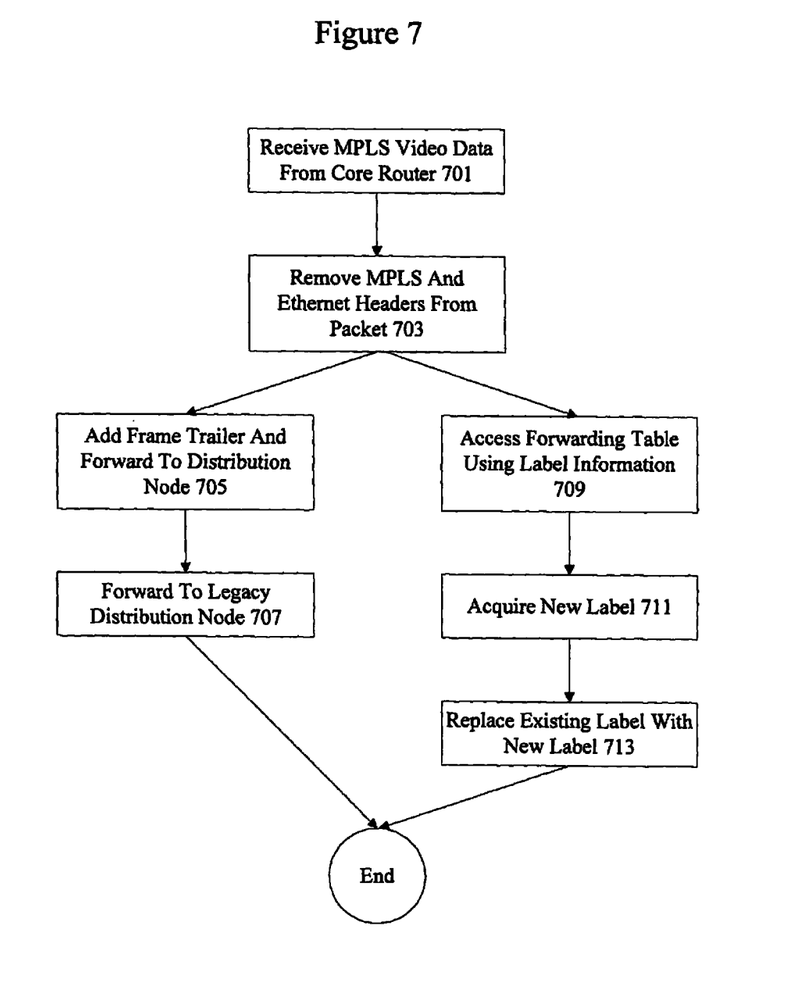
FIG. 7 is a flow process diagram showing a technique for providing core packet network data to a distribution node.

FIG. 7 is a flow process diagram showing the processing of video information when video information is received from a packet based network. At 701, video data is received from the packet based network at an edge router. In typical instances, an edge router would merely access a forwarding table and transmit the video data to another node. However, the techniques and mechanisms of the present invention allow forwarding of the video data to multiple nodes. At 703, the video packet is processed to remove label switching and Ethernet headers. Alternatively, video frames are extracted from the video packet. A frame trailer is added to the video information to allow forwarding to a cell based legacy distribution node at 705. At 707, the video information is forwarded to the legacy distribution node. In one embodiment, the label is removed from the label switching header and used to access an entry in a forwarding table at 709. At 711, a new label is acquired. It should be noted that in some embodiments, a sequence of labels are already provided in the video packet and no new replacement label is acquired. In another embodiment, a label is removed and used to forward the video information. The subsequent label is already included in the label switching header. In many embodiments, however, the existing label is replaced with a new label to allow forwarding of the video information at 713.

The techniques and mechanisms of the present invention can be implemented on a variety of devices. In one example, techniques and mechanisms can be implemented in software, firmware, or hardware on an edge router. In one example, in edge router may be located on a single chip in a computer system.

A software or software/hardware hybrid implementation of the techniques of the present invention may be implemented on a general-purpose programmable machine selectively activated or reconfigured by a computer program stored in memory. Such programmable machine may be a network device designed to handle network traffic, such as, for example, a router or a switch. For example, the mapping mechanism of the present invention may be specially configured routers or servers such as specially configured router models 1600, 6500, 7600 and 12000 available from Cisco Systems, Inc. of San Jose, Calif. A general architecture for some of these machines will appear from the description given below. In an alternative embodiment, techniques may be implemented on a general-purpose network host machine such as a personal computer or workstation. Further, the invention may be at least partially implemented on a card (e.g., an interface card) for a network device or a general-purpose computing device.

Figure 8:
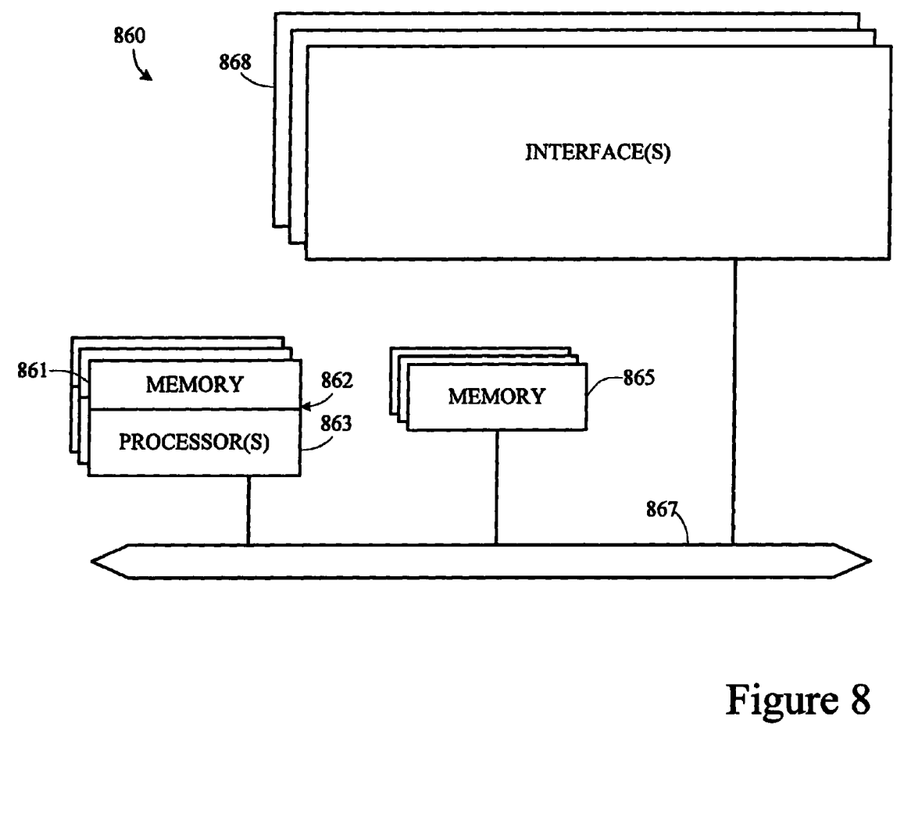
FIG. 8 is a diagrammatic representation showing a router.

Referring now to FIG. 8, a network device 860 suitable for implementing the techniques of the present invention includes a master central processing unit (CPU) 862, interfaces 868, and a bus 867 (e.g., a PCI bus) or an interconnect. When acting under the control of appropriate software or firmware, the CPU 862 may be responsible for implementing specific functions associated with the functions of a desired network device. For example, when configured as a gateway device, the CPU 862 may be responsible for removing tags, determining services associated with tags, and replacing tags with other forms of header information. The CPU 862 preferably accomplishes all these functions under the control of software including an operating system, and any appropriate applications software.

CPU 862 may include one or more processors 863 such as a processor from the Motorola family of microprocessors or the MIPS family of microprocessors. In an alternative embodiment, processor 863 is specially designed hardware for controlling the operations of network device 860. In a specific embodiment, a memory 861 (such as non-volatile RAM and/or ROM) also forms part of CPU 862. However, there are many different ways in which memory could be coupled to the system. Memory block 861 may be used for a variety of purposes such as, for example, caching and/or storing data, programming instructions, etc.

The interfaces 868 are typically provided as interface cards (sometimes referred to as "line cards"). Generally, they control the sending and receiving of data packets over the network and sometimes support other peripherals used with the network device 860. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 862 to efficiently perform routing computations, network diagnostics, security functions, etc.

Although the system shown in FIG. 8 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 865) configured to store data, program instructions for the general-purpose network operations and/or other information relating to the functionality of the techniques described herein. The program instructions may control the operation of an operating system and/or one or more applications, for example. The memory or memories may also be configured to store data structures, mapping tables, and/or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. Therefore, the scope of the invention should be determined with reference to the appended claims.

What is claimed is:

1. A method for transmitting video data over a packet based network, the method comprising:
   receiving, from a cell based network, video data associated with a virtual circuit, the video data transmitted over a cell-based network and comprising a video stream, wherein the virtual circuit is one of a plurality of virtual circuits of the cell based network, each virtual circuit associated with a different video stream;
   identifying a virtual local area network of a packet based network on which to forward the received video data by mapping the virtual circuit associated with the video data to a virtual local area network associated with the packet based network, wherein the virtual local area network is associated with a subset of nodes of the packet based network, the subset of nodes comprising a plurality of nodes;
   identifying label information associated with one or more label switched paths of the packet based network, for the purpose of forwarding the video data associated with the virtual circuit to the subset of nodes, by mapping the virtual local area network and/or the virtual circuit to the label information, wherein the virtual circuit is mapped to the virtual local area network, and the virtual local area network and/or virtual circuit are mapped to the label information, using a table identifying related virtual circuits, virtual local area networks, and label information;
   associating the virtual local area network with the corresponding label information relating to the packet based network using the table, wherein the label information is used by nodes in the packet based network to forward the video data to the subset of nodes in the packet based network.

2. The method of claim 1, further comprising transporting the video data with an Ethernet broadcast header.

3. The method of claim 1, wherein the packet-based switched network comprises edge routers.

4. The method of claim 1, wherein mapping the virtual circuit to the virtual local area network is performed at a first edge router.

5. The method of claim 4, wherein the first edge router is coupled to a service provider headend.

6. The method of claim 5, wherein the service provider headend is coupled to a content provider video headend.

7. The method of claim 4, wherein a second edge router is coupled to a first edge router.

8. The method of claim 7, wherein the video data is distributed to a distribution node coupled to a second edge router.

9. The method of claim 8, wherein the second edge router forwards the video data to both a third edge router and to the distribution node.

10. The method of claim 9, wherein the label information is a label stack.

11. The method of claim 10, wherein the second edge router removes the label stack from a broadcast Ethernet packet and switches the broadcast Ethernet packet to the associated virtual local area network.

12. The method of claim 11, wherein the associated virtual circuit receives the broadcast Ethernet packet, removes the Ethernet header, and sends it to an ATM link with AAL5 encapsulation.

13. The method of claim 12 wherein the broadcast Ethernet packet is forwarded to a third edge router with a new label stack.

14. The method of claim 13, wherein the label information is removed before forwarding the video data to the distribution node.

15. The method of claim 9, wherein video data is forwarded to the distribution node.

16. The method of claim 9, wherein label information is updated before forwarding the video data to the third edge router.

17. The method of claim 1, wherein the video data is distributed to a plurality of cell-based distribution nodes coupled to the packet-based switched network.

18. The method of claim 1, wherein the video data is MPEG compressed video data provided by a video headend.

19. An edge router, comprising:
   an interface configured to receive, from a cell based network, video data associated with a virtual circuit, the video data transmitted over a cell-based network and comprising a video stream, wherein the virtual circuit is one of a plurality of virtual circuits of the cell based network, each virtual circuit associated with a different video stream;

a processor configured to identify a virtual local area network of the packet based network on which to forward the received video data by mapping the virtual circuit associated with the video data to a virtual local area network associated with the packet based network, and identify label information associated with one or more label switched paths of the packet based network, for the purpose of forwarding the video data associated with the virtual circuit, by mapping the virtual local area network and/or the virtual circuit to the label information, wherein the virtual local area network is associated with a subset of nodes in the packet based network, and wherein the virtual circuit is mapped to the virtual local area network, and the virtual local area network and/or virtual circuit are mapped to the label information, using a table identifying related virtual circuits, virtual local area networks, and label information, and the virtual local area network is associated with the subset of nodes in the packet based network using the table, wherein the label information is used by nodes in the packet based network to forward the video data to the subset of nodes in the packet based network.

20. The edge router of claim 19, wherein the processor is further configured to associate the video data with an Ethernet broadcast header.

21. The edge router of claim 19, wherein the packet-based switched network comprises edge routers.

22. The edge router of claim 21, wherein the label information is a label stack.

23. The edge router of claim 22 wherein a broadcast Ethernet packet is forwarded with a label stack.

24. The edge router of claim 23, wherein the video data is forwarded to a distribution node.

25. The edge router of claim 24, wherein the label information is removed before forwarding the video data to the distribution node.

26. The edge router of claim 19, wherein label information is updated before forwarding the video data.

27. The edge router of claim 19, wherein the video data is distributed to a plurality of cell-based distribution nodes coupled to the packet-based switched network.

28. The edge router of claim 19, wherein the video data is MPEG compressed video data provided by a video headend.

29. An apparatus for transmitting video data, the apparatus comprising:

means for receiving, from a cell based network, video data associated with a virtual circuit, the video data transmitted over a cell-based network and comprising a video stream, wherein the virtual circuit is one of a plurality of virtual circuits of the cell based network, each virtual circuit associated with a different video stream;

means for identifying a virtual local area network of a packet based network on which to forward the received video data by mapping the virtual circuit associated with the video data to a virtual local area network associated with the packet based network, wherein the virtual local area network is associated with a subset of nodes of the packet based network, the subset of nodes comprising a plurality of nodes;

means for identifying label information associated with one or more label switched paths of the packet based network, for the purpose of forwarding the video data associated with the virtual circuit to the subset of nodes, by mapping the virtual local area network and/or the virtual circuit to the label information, wherein the virtual circuit is mapped to the virtual local area network, and the virtual local area network and/or the virtual circuit are mapped to the label information, using a table identifying related virtual circuits, virtual local area networks, and label information;

means for associating the virtual local area network with the corresponding label information relating to the packet based network using the table, wherein the label information is used by nodes in the packet based network to forward the video data to the subset of nodes in the packet based network.

30. The apparatus of claim 29, further comprising means for transporting the video data with an Ethernet broadcast header.

31. The apparatus of claim 29, wherein the table further identifies related channel information and a set of designated destination nodes is determined based on the channel information in the table.

* * * * *